E. L. TAYLOR.
WOODWORKING MACHINE.
APPLICATION FILED DEC. 4, 1919.
1,372,374.
Patented Mar. 22, 1921.
3 SHEETS—SHEET 1.
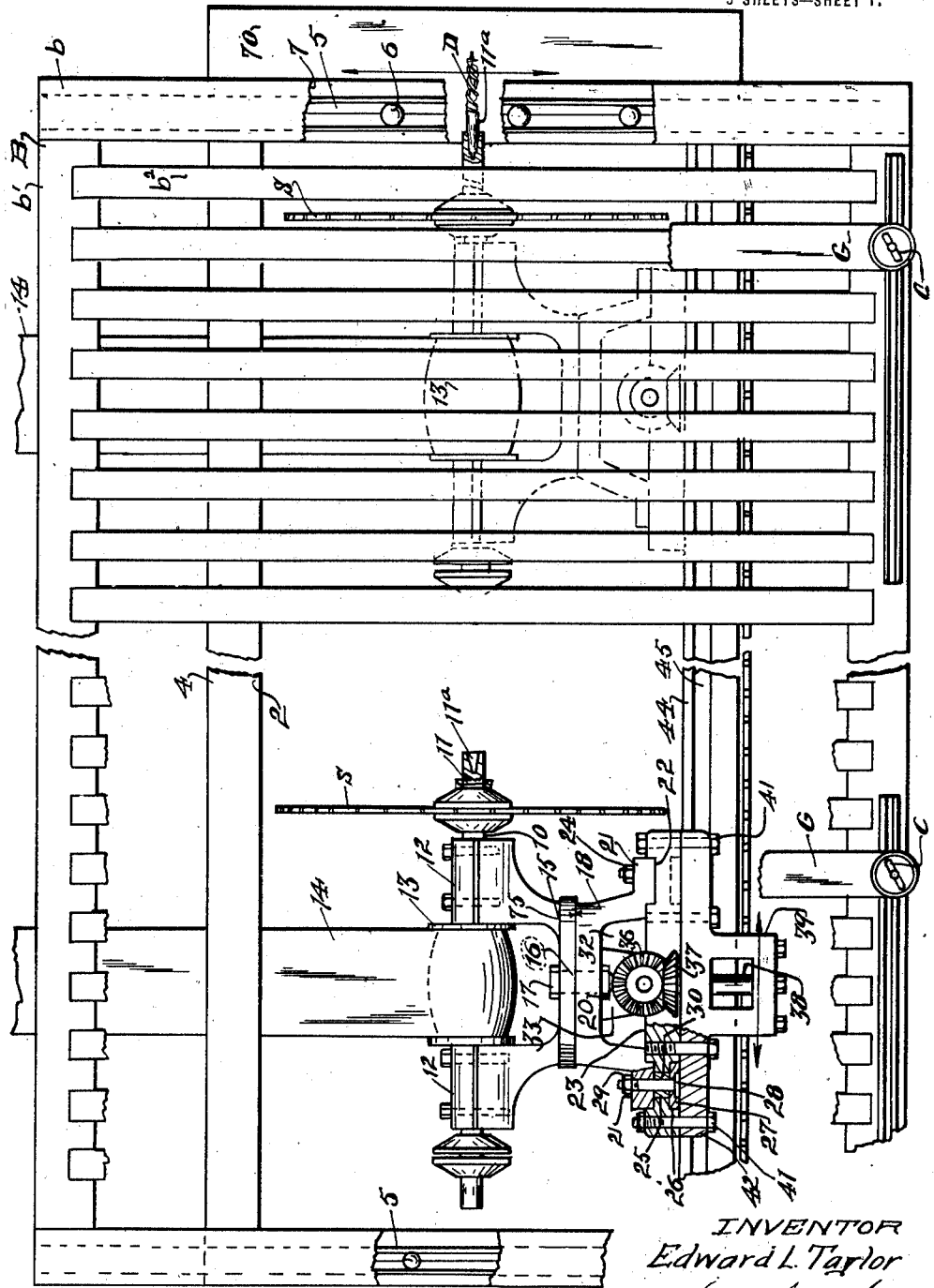
INVENTOR
Edward L. Taylor
By Hazard & Miller
Att'ys

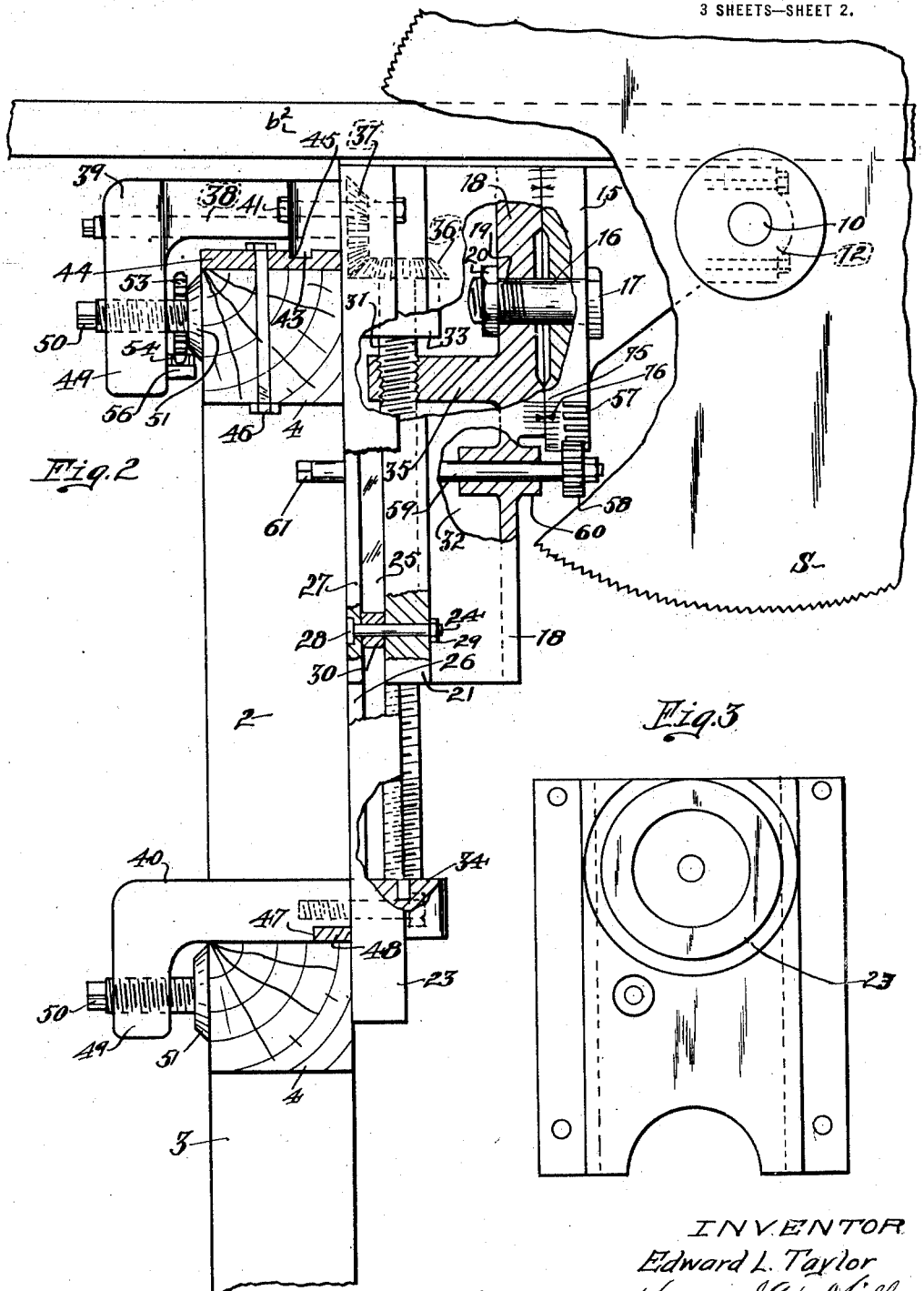

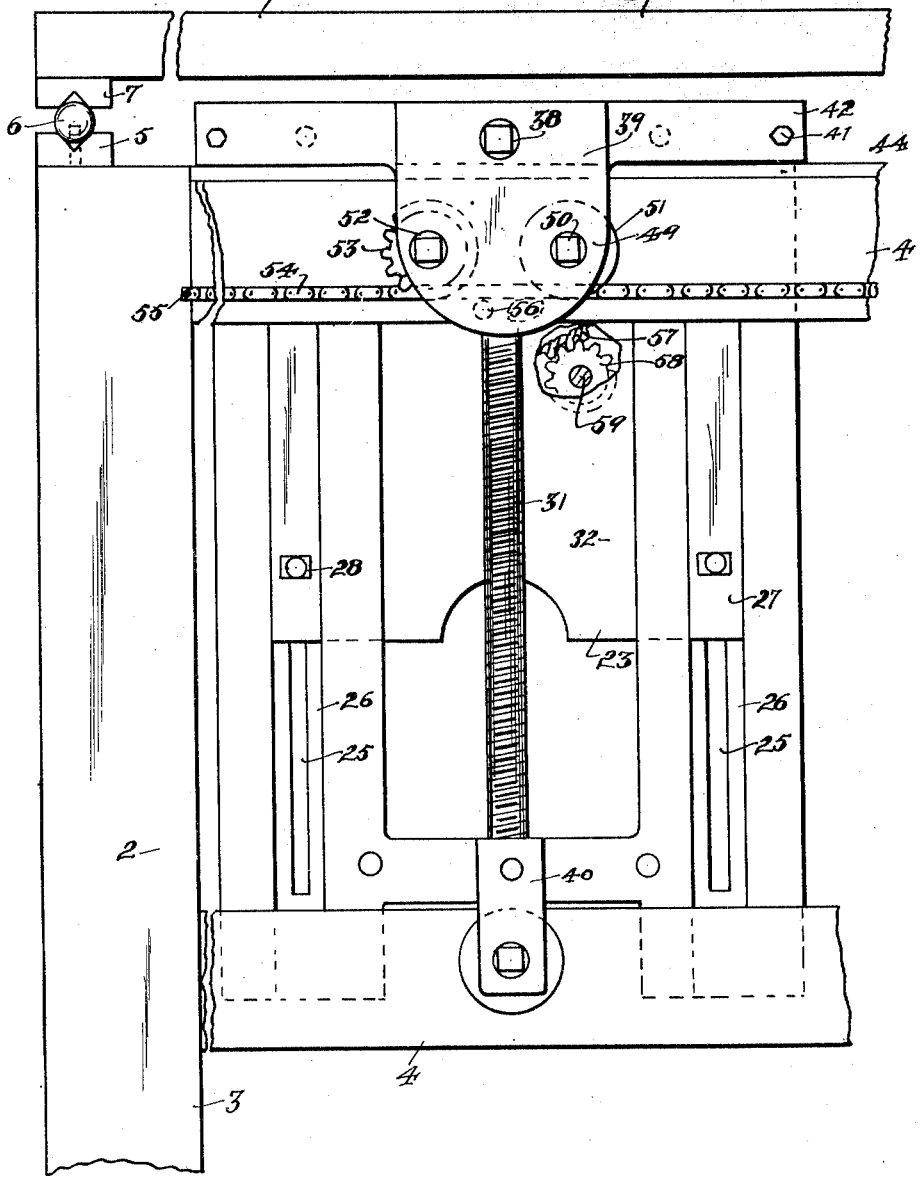

UNITED STATES PATENT OFFICE.

EDWARD L. TAYLOR, OF LONG BEACH, CALIFORNIA.

WOODWORKING-MACHINE.

1,372,374.  Specification of Letters Patent.  Patented Mar. 22, 1921.

Application filed December 4, 1919. Serial No. 342,501.

*To all whom it may concern:*

Be it known that I, EDWARD L. TAYLOR, a citizen of the United States, residing at Long Beach, in the county of Los Angeles and State of California, have invented new and useful Improvements in Woodworking-Machines, of which the following is a specification.

This invention relates to wood working machinery and especially to circular saws and has for its object to provide for the longitudinal, vertical and oblique movement or adjustment and setting of the saw disk with respect to the table or frame, and further to provide for the several adjustments with facility and thus to enable the substantially universal adjustment of the saw with respect to the work in hand.

A further object of the invention is to provide a combined circular saw structure and drill apparatus.

The invention consists of the features illustrated in the accompanying drawings and described and claimed hereinafter.

Figure 1 is a plan view of the improved saw, parts being broken away for clarity.

Fig. 2 is an elevational section showing, on a larger scale, the saw adjusting apparatus.

Fig. 3 is a face view of the slide.

Fig. 4 is a front elevation of a portion of the saw frame and table showing in detail the front elevation of the carriage.

My present invention is incorporated in a circular saw structure having a rigid framework 2 including legs 3 and horizontal beams 4, the transverse end horizontal beam being provided with rails 5 forming runners for ball bearings 6 upon which rest top bearings 7 that are attached to the lower end members of the work bed B which, in the present case, is, therefore, designed to be reciprocated transversely across the top of the framework 2.

This work bed may be of any appropriate form of construction and comprises the rectangular frame $b$, the longitudinal members $b'$ which are notched at their inner corners to receive removable slats $b^2$ forming parallel spaces between which the saw or saws, hereinafter to be described, can be projected upwardly to the desired height to sever the work that may be placed upon the work bed B when the latter is reciprocated with respect to the running saws. Any suitable type of work gage or stop may be mounted upon the top of the work bed B, such gage being indicated at G, for instance, and capable of being turned to a desirable angle about a pivot or a clamp C which may be adjustable in suitable ways along the front rail of the bed.

It is desirable to provide a circular saw organization in which the saw can be adjusted vertically and longitudinally and also obliquely with respect to the work bed, and with this in view, my present invention comprises means capable of such adjustment as to set the saw and hold the same in any of the desired positions.

The saw S is adapted to be mounted upon a shaft 10 that may be threaded at each end as at 11, so that a saw can be set on either or both of its ends and suitably clamped beyond the boxes 12 in which the shaft is journaled and between which boxes is provided space to receive the pinion pulley 13 from which a driving belt 14 may be extended rearwardly from the frame to any suitable driving pulley; the length of the belt 14, preferably, being such that the shaft can be moved vertically with respect to the axis of the driving pulley and can be moved laterally or longitudinally along the frame and also tilted so as to hold the saw obliquely to the plane of the bed B without interfering with the driving efficiency of the belt.

I have shown a table and frame structure of such proportions that two of the shafts 11 can be supported thereon in substantially duplicate supporting and adjusting mechanism, the description of one of which will therefore suffice.

The boxes 12 of one saw shaft are shown as cast integrally with a substantially circular base 15 with a plane parallel to the axis of the shaft 10, the base being centrally perforated as at 16 to receive a pivot bolt or pin 17 passed therethrough and also through the front body portion of a slide 18 having a hole 19 in which the pin 16 is inserted, the latter provided with a clamp nut 20 to tightly set the base 15 of the bearings in suitable adjusted position. The slide 18 has parallel vertically disposed runners 21 extending backwardly from the supporting plane or body part 18, the runners designed to fit and operate in parallel vertical ways 22 in the face of a carriage 23 which is clearly illustrated in face view in Fig. 4.

In order to connect the slide 18 to the carriage 23, bolts 24 are passed through the runners 21 at suitable points and also through vertical channels 25 extending through the carriage 23, the front face of which is provided with vertical channels 26 in each of which is a slide block 27 having a countersunk portion to receive the inserted head 28 of the bolts 24, the outer ends of which are provided with clamp nuts 29, Fig. 1.

To permit free vertical adjustment of the slide 18 on the carriage 23, each of the bolts 24 is provided with a space washer or bushing 30 in the slot or opening 25 the length of the bushing 30 being somewhat or slightly greater than the depth of the slot, so that when the lock nut 29 is tightened up the slide block 26 will not be jammed in its seat but will operate to slide freely up and down the respective ways.

For the purpose of securing vertical adjustment of the slide 18 with respect to the carriage 23, the latter is provided with an adjusting screw 31 extending vertically in a chamber 32 provided therefor and between an upper bearing 33 and a lower bearing 34. Disposed on the screw 31 between these bearings and mounted or formed integrally on the adjacent face of the slide 18 is a threaded projection or nut forming part 35 in which the screw 31 is engaged, and whereby when the latter is rotated will secure the vertical movement of the slide 18 as may be desired to lift or lower the saw S with respect to the work.

The screw 31 may be turned through means of a bevel gear 36 mounted on its upper end above the upper bearing 33, and this gear is engaged by a complementary gear 37 that has a stem or shaft 38 extending rearwardly through an apron-like part 39 formed on, or attached to, the outer face of the carriage 23, the stem or shaft 38 being extended through the apron 39, as in Fig. 2, and has its outer end adapted for the reception of a suitable tool whereby it can be readily turned. The upper apron 39 in combination with a lower apron 40 projecting from the face of the carriage 23 forms means for supporting the carriage and providing for the longitudinal adjustment of the same along the frame 2. The upper apron 39 is shown as bolted to the face of the carriage 23 by means of bolts 41 passing through laterally extended ears 42 of the apron 39, and the lower face of the ears 42 are shown as provided with a continuous key or runner 43, in this case, engaging a rail 44 that is slotted at 45 and is bolted or otherwise secured as at 46 to the top horizontal beam 4 of the frame. The lower apron 40 is also bolted to the lower end of the carriage 23 and is notched as at 47 to receive a guide rail 48 laid along the upper face of the lower timber 4 of the frame.

The upper and lower aprons 39 and 40 each have a downwardly extending portion 49 overhanging the faces of the respective horizontal members 4—4 and are provided with clamp screws 50 passing therethrough and having washer or bearing plates 51 at their inner ends, these bearing on, and being adapted to clamp up against the faces of the timbers so as to draw the carriage 23 into substantial contact therewith and hold the latter in any of its adjusted positions horizontally along the frame.

To secure the longitudinal adjustment of the carriage 23 to bring the saw S to the desired position, the upper apron 39 is provided with a short shaft 52 having its outer end adapted for attachment of a tool by which it can be turned, and on the inner end of the shaft is mounted a sprocket or other toothed wheel 53, the teeth of which are adapted to engage with the coöperative toothed device, as for instance a sprocket chain 54, the ends of which are securely connected as at 55 to the adjacent portions of the frame 2.

The chain 54 is kept from sagging out of contact with the pinion 53 by means of a suitable supporting part as a pin 56 that extends inwardly from the face of the pendent portion 49 of the upper apron so that the teeth of the pinion 53 are constantly meshed with the toothed part or sprocket chain 54 irrespective of the longitudinal position of the carriage along the frame. From this it will be seen that in order to slide the carriage and change the position of the saw longitudinally it is only necessary to release the clamping means 51 that hold the carriage 23 and then apply a suitable tool to the shaft 52, turn the latter and this will cause the carriage to be advanced along the relatively fixed linked member 54, whereupon the clamps 51 can again be set up to hold the carriage.

The base 15 of the saw shaft boxes 12 can be turned readily about this pivot bolt 16 as soon as the latter is loosened up sufficiently to permit the turning, and if desired this turning can be accomplished with facility if the base 15 be made of circular outline and toothed as at 57 so as to engage a pinion 58 secured or formed on the end of a shaft 59 turnably mounted in a bearing 60 on the adjacent body of the slide 18. The shaft 59 is, preferably, of such length as to be extended well toward the front of the frame and has its exposed end shaped as at 61 to receive a suitable tool by which it may be turned. Preferably, the ends of the several shafts 38, 52 and 59 and the clamp screws 50 are made of such form as to require but one wrench for the manipulation of any of these parts.

From the above it will be seen that I have provided means that enable the saw or saws S to be adjusted longitudinally along the saw table to any desired position and also to enable the saw to be vertically adjusted to suitable height limited only by the superposed sliding work bed B with respect to the saw bearings, and also I have provided for an oblique or angular relation of adjustment of the saw S to the work upon the bed, and these several adjustments can be made of the saw at any of its several positions along the table or frame.

In order to enable the use of the apparatus for the purpose of drilling as well as sawing work, I prefer to provide the ends of the saw shaft or shafts 11 with drill or other tool receiving sockets 11ª into which the tool as a drill D can be inserted, and therefore by providing a bench indicated at 70 at each end of the frame, work can be placed on the bench and the shaft 10 elevated or shifted longitudinally and then advanced while being driven so as to drill a hole or holes into the work.

The circular edge or periphery of the base 15 of the contiguous circular edge of the slide 18 may, one or the other, be calibrated or index marked as at 75 to register with a corresponding indicating mark or pointer 76 on the other and relatively movable part, in this case, the mark 76 being placed on the rim of the base 15. This will enable the accurate adjustment of the base 15 to hold the saw at the desired angle or obliquity to the work.

It is understood that the machine is capable of being adapted as a shaper by the removal of the saws or saw on the respective shafts 10 and the mounting on the end thereof of any suitable shaping cutter or tool, and when the shaft 10, on which it is mounted, is arranged in a substantially vertical, or if desired oblique position, it will be seen that the cutting tool can be used in the ordinary processes of shaping.

Various changes may be made without departing from the spirit of my invention as claimed.

I claim:

1. In a wood working machine, the combination with a frame having a pair of horizontally disposed parallel rails, of brackets overlying said rails, vertical guideways connecting the said brackets on one side of said rails, means for clamping said brackets to said rails, a vertically disposed threaded shaft mounted for rotation in bearings on said brackets, means for imparting rotary movement to said threaded shaft, a bracket arranged for sliding movement between the guideways and connected to said threaded shaft so as to be moved vertically thereby, a disk mounted on a horizontal axis on said vertically movable bracket, a bracket mounted upon said disk, and a saw carrying shaft journaled in said last mentioned bracket.

2. In a wood working machine, the combination with a frame having a pair of horizontally disposed parallel rails, of brackets overlying said rails, vertical guideways connecting the said brackets on one side of said rails, means for clamping said brackets to said rails, a vertically disposed threaded shaft mounted for rotation in bearings on said brackets, means for imparting rotary movement to said threaded shaft, a bracket arranged for sliding movement between the guideways and connected to said threaded shaft so as to be moved vertically thereby, a disk mounted on a horizontal axis on said vertically movable bracket, a bracket mounted upon said disk, a saw carrying shaft journaled in said last mentioned bracket and means including a sprocket wheel and relatively fixed sprocket chain for moving the first mentioned pair of brackets and the parts carried thereby longitudinally of the parallel rails of the frame.

3. In a wood working machine, the combination with a frame having a pair of horizontally disposed parallel rails, of brackets overlying said rails, vertical guideways connecting the said brackets on one side of said rails, means for clamping said brackets to said rails, a vertically disposed threaded shaft mounted for rotation in bearings on said brackets, means for imparting rotary movement to said threaded shaft, a bracket arranged for sliding movement between the guideways and connected to said threaded shaft so as to be moved vertically thereby, a disk mounted on a horizontal axis on said vertically movable bracket, a bracket mounted upon said disk, a saw carrying shaft journaled in said last mentioned bracket and means for rotating said disk upon its axis to vary the angularity of the saw carrying shaft relative to a horizontal plane.

4. In a wood working machine, the combination with a frame having a pair of horizontally disposed parallel rails, of brackets overlying said rails, vertical guideways connecting the said brackets on one side of said rails, means for clamping said brackets to said rails, a vertically disposed threaded shaft mounted for rotation in bearings on said brackets, means for imparting rotary movement to said threaded shaft, a bracket arranged for sliding movement between the guideways and connected to said threaded shaft so as to be moved vertically thereby, a disk mounted on a horizontal axis on said vertically movable bracket, a bracket mounted upon said disk, a saw carrying shaft journaled in said last mentioned bracket, means including a sprocket wheel and relatively fixed sprocket chain for moving the first mentioned pair of brackets and the parts carried thereby longitudinal of the parallel rails of the frame and means for rotating said disk upon its axis to vary the angularity of the saw carrying shaft relative to a horizontal plane.

5. In a wood working machine, the combination with a frame having a pair of horizontally disposed parallel rails, of brackets overlying said rails, vertical guideways connecting the said brackets on one side of said rails, means for clamping said brackets to said rails, a vertically disposed threaded shaft mounted for rotation in bearings on said bracket, means for imparting rotary movement to said threaded shaft, a bracket arranged for sliding movement between the guideways and connected to said threaded shaft so as to be moved vertically thereby, a disk mounted on a horizontal axis on said vertically movable bracket, a bracket mounted upon said disk, a saw carrying shaft journaled in said last mentioned bracket, a work supporting rack arranged for horizontal sliding movement on top of the frame and adjustable work guides on said sliding frame.

6. In a wood working machine, the combination with a frame having a pair of horizontally disposed parallel rails, of brackets overlying said rails and arranged to be moved lengthwise thereupon, vertically disposed guideways secured to said brackets on one side of said rails, means seated in the opposite ends of the brackets for clamping the same and the vertical guideways to said rails, a bracket arranged for vertical movement between said guideways and a saw carrying member adjustably arranged on said bracket.

7. In a wood working machine, the combination with a frame having a pair of horizontally disposed parallel rails, of brackets overlying said rails and arranged to be moved lengthwise thereupon, vertically disposed guideways secured to said brackets on one side of said rails, means seated in the opposite ends of the brackets for clamping the same and the vertical guideways to said rails, a bracket arranged for vertical movement between said guideways, a saw carrying member adjustably arranged on said bracket, a work supporting rack arranged for sliding movement on top of the frame and adjustable work guides carried by said work support.

In testimony whereof I have signed my name to this specification.

EDWARD L. TAYLOR.